INVENTORS
JOHN R. McDANIEL
JOSEPH T. HINE
BY
Nilsson Robbins & Anderson
ATTORNEY INVENTORS
JOHN R. McDANIEL
JOSEPH T. HINE
BY
Nilsson, Robbins & Anderson
ATTORNEY

COLOR TELEVISION DATA DISPLAY SYSTEM

Filed Nov. 23, 1964 6 Sheets-Sheet 3

INVENTORS
JOHN R. McDANIEL
JOSEPH T. HINE
BY
Nilsson, Robbins & Anderson
- ATTORNEY -

COLOR TELEVISION DATA DISPLAY SYSTEM

Filed Nov. 23, 1964 6 Sheets-Sheet 4

INVENTORS
JOHN R. McDANIEL
JOSEPH T. HINE
BY Wilson Robbins & Anderson
ATTORNEY

COLOR TELEVISION DATA DISPLAY SYSTEM

INVENTORS
JOHN R. McDANIEL
JOSEPH T HINE
BY Wilson Robbins & Anderson
- ATTORNEY -

COLOR TELEVISION DATA DISPLAY SYSTEM

Filed Nov. 23, 1964 6 Sheets-Sheet 6

INVENTORS
JOHN R McDANIEL
JOSEPH T. HINE
BY Nilsson, Robbins & Anderson
ATTORNEY 3,387,084
COLOR TELEVISION DATA DISPLAY SYSTEM
Joseph T. Hine, Rancho Cordova, and John R. McDaniel, Los Alamitos, Calif., assignors, by mesne assignments, to McDonnell Douglas Corporation, Santa Monica, Calif., a corporation of Maryland
Filed Nov. 23, 1964, Ser. No. 413,256
11 Claims. (Cl. 178—6.8)

ABSTRACT OF THE DISCLOSURE

Photographic slide changer is controlled manually or by computer to select a color slide which is electrically converted and displayed on a color television screen as static data. Dynamic data is continuously supplied to the computer and relates to various parts of the system displayed by any selected slide. Control means including a multiple channel magnetic memory operatively functions in response to the selection of any particular slide to cause the transfer and suitable reproduction of the correct and instantaneous dynamic data at appropriate locations on the television screen to provide a composite display of static and dynamic data thereon.

This invention relates to a data display system and while not limited thereto, more particularly relates to systems for visually displaying data obtained from a monitored system along with pictorial static representations of portions of the system to which the data relates. The invention described herein was made in the performance of work under a NASA contract and is subject to the provisions of the National Aeronautics and Space Act of 1958, public law 85-568 (72 Stat. 426; 42 U.S.C. 2451) as amended.

In recent years, computers have been used in increasing numbers to automatically monitor and control various processes. For example, computer systems are effective for this purpose in cooperation with missile check-out systems, chemical processing systems, machine tool control systems, and so on. In general, in spite of considerable automatic control and built-in safety features in these systems, it remains desirable to provide capabilities whereby a man can exercise supervisory or dominant control. The difficulty in accomplishing such control resides primarily in providing the man with current information on the status of the process. For example, if output data is provided to the man in the form of printed tabulations, the volume of data becomes far too voluminous for human comprehension in the available time. Of course, given sufficient time, the operator can perceive the process from printed tabulations; however, usually, the activity of concern is a real-time operation so that no opportunity exists for careful study of voluminous tabulated data. That is, it is exceedingly difficult, if not impossible, for an operator to make real-time decisions by observing the high-volume alphanumeric output of various prior output devices for computing systems. Therefore, the operator requires an improved and different form of display device that is well suited for human perception.

Accordingly, it is an object of the present invention to provide an improved output device for data as represented in a computing system, which affords improved communication to a human operator.

Another object of the present invention is to provide an improved data presentation system utilizing visual manifestations which may include diagrams, schematics, and so on (either in black and white or color images) along with current data indications.

Still another object of the present invention is to provide an improved output system having considerable capability and flexibility to present data in a readily-perceivable form; however, which does not require extensive data storage capability.

A further object of the present invention is to provide an output system for data form a computer, which utilizes established visual formats, to effectively present dynamic data for human perception.

Still a further object of the present invention is to provide an improved and effective data display system which requires a reduced amount of operator control or programming effort.

One further object of the present invention is to provide a fast, economical and effective visual data presentation system for conveying information relating to a real-time process to a human operator so that he may take action if neceassary or desirable, at a time when such action is effective.

Briefly, these and other objects and advantages of the present invention are achieved by recognizing and implementing the distinctions between static data presentation and dynamic data presentation. The system incorporates means for storing and displaying static data, e.g. charts, schematics, diagrams and other environmental or background format data, as by the use of a photographic apparatus. This portion of the system operates in conjunction with a memory system, a control structure and an interface to a computer to provide dynamic data in visual form at significant locations on the visual static data representation. For example, a flow chart may be visually presented as the static data including blocks or symbols in which numerical values or status words that indicate various conditions may be provided for ready perception by a human operator. The system, in combining the two sources of data may employ the face of a color-television monitor tube. Further details of these and other novel features of the present invention along with the operation thereof, as well as additional objects and advantages of the invention will become apparent and will be best understood from a consideration of the following description taken in conjunction with the accompanying drawings which are all presented by way of illustrative example only, in which:

Figure 1:
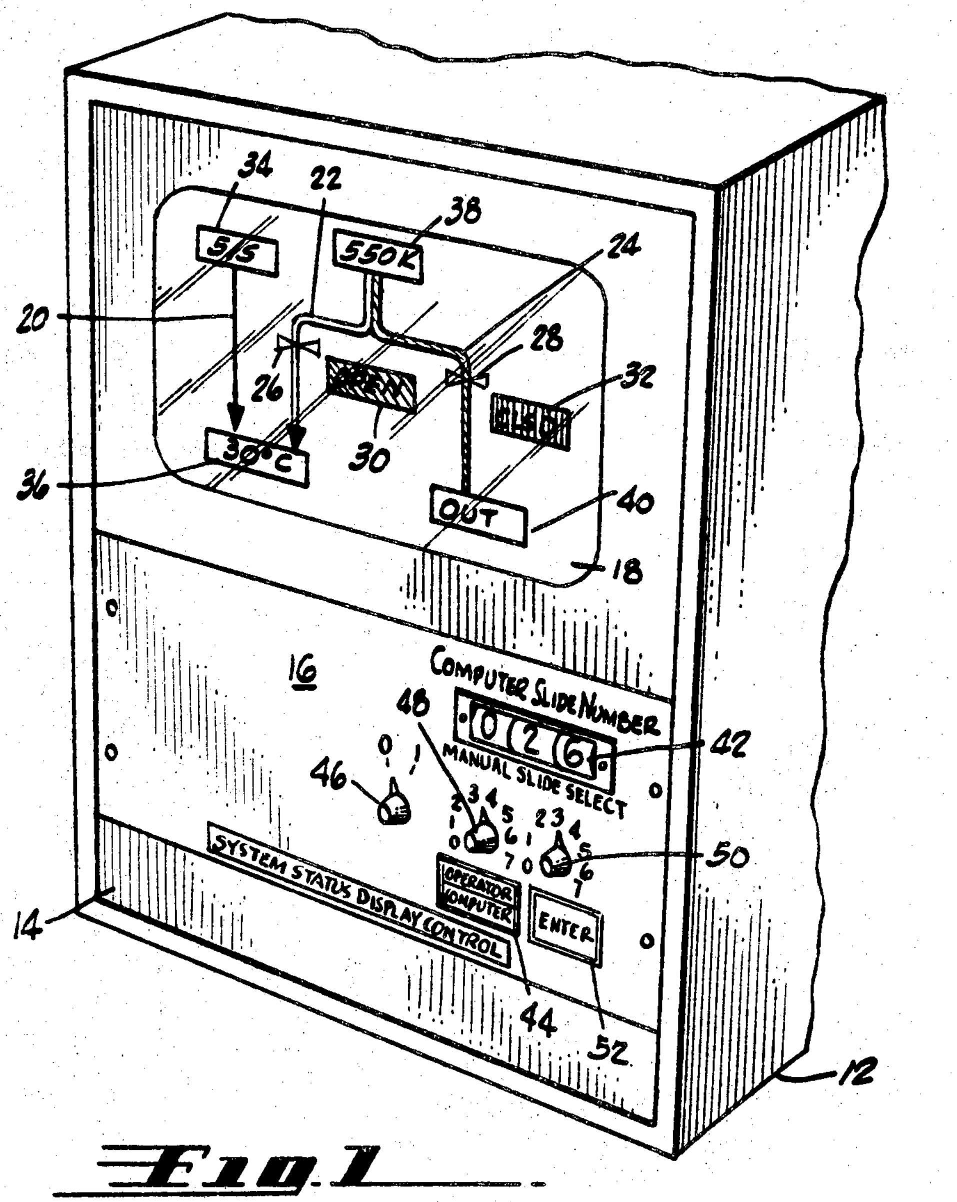
FIGURE 1 is a perspective view of one portion of an apparatus constructed in accordance with the principles of the present invention.
Figure 4:
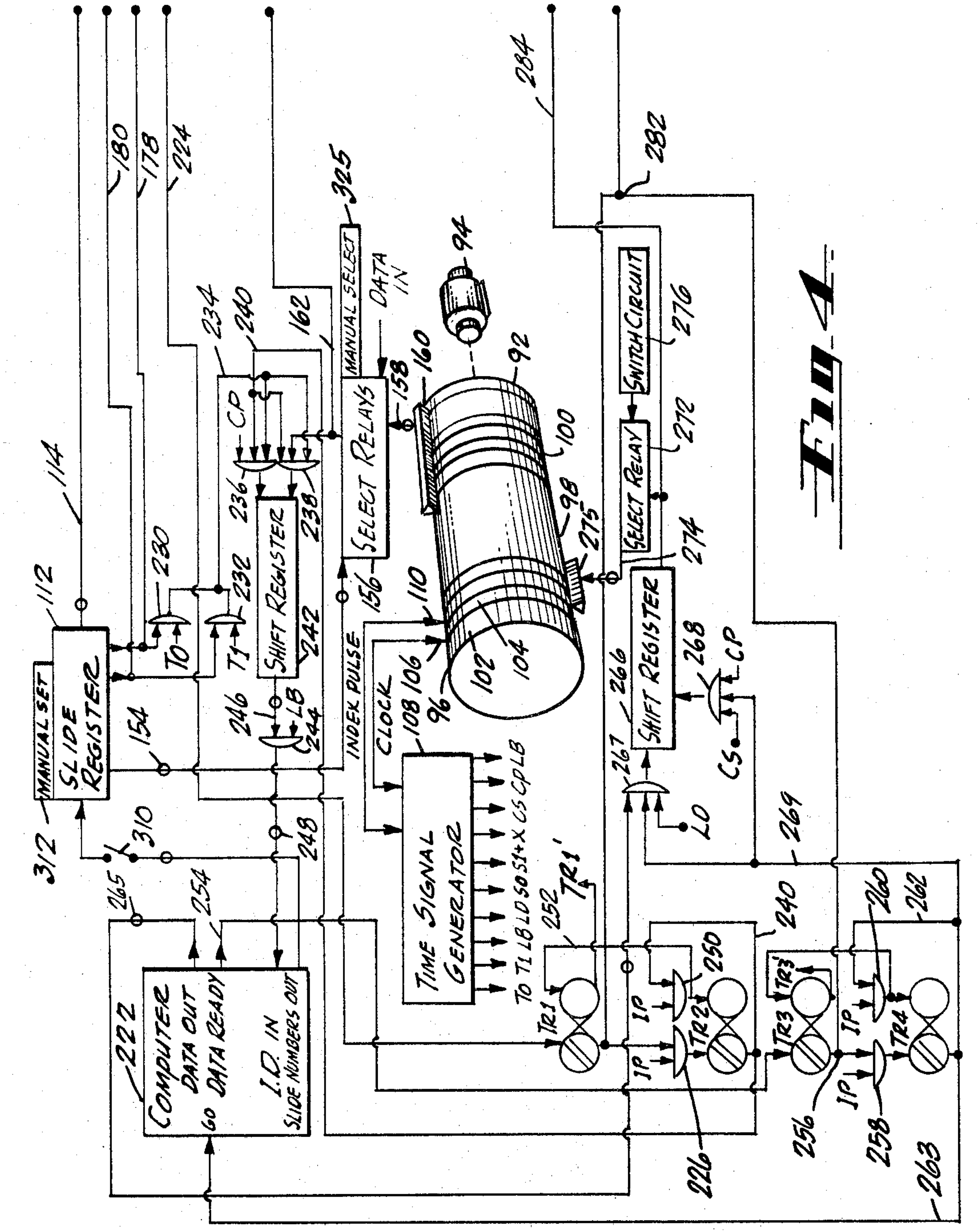
Figure 5:
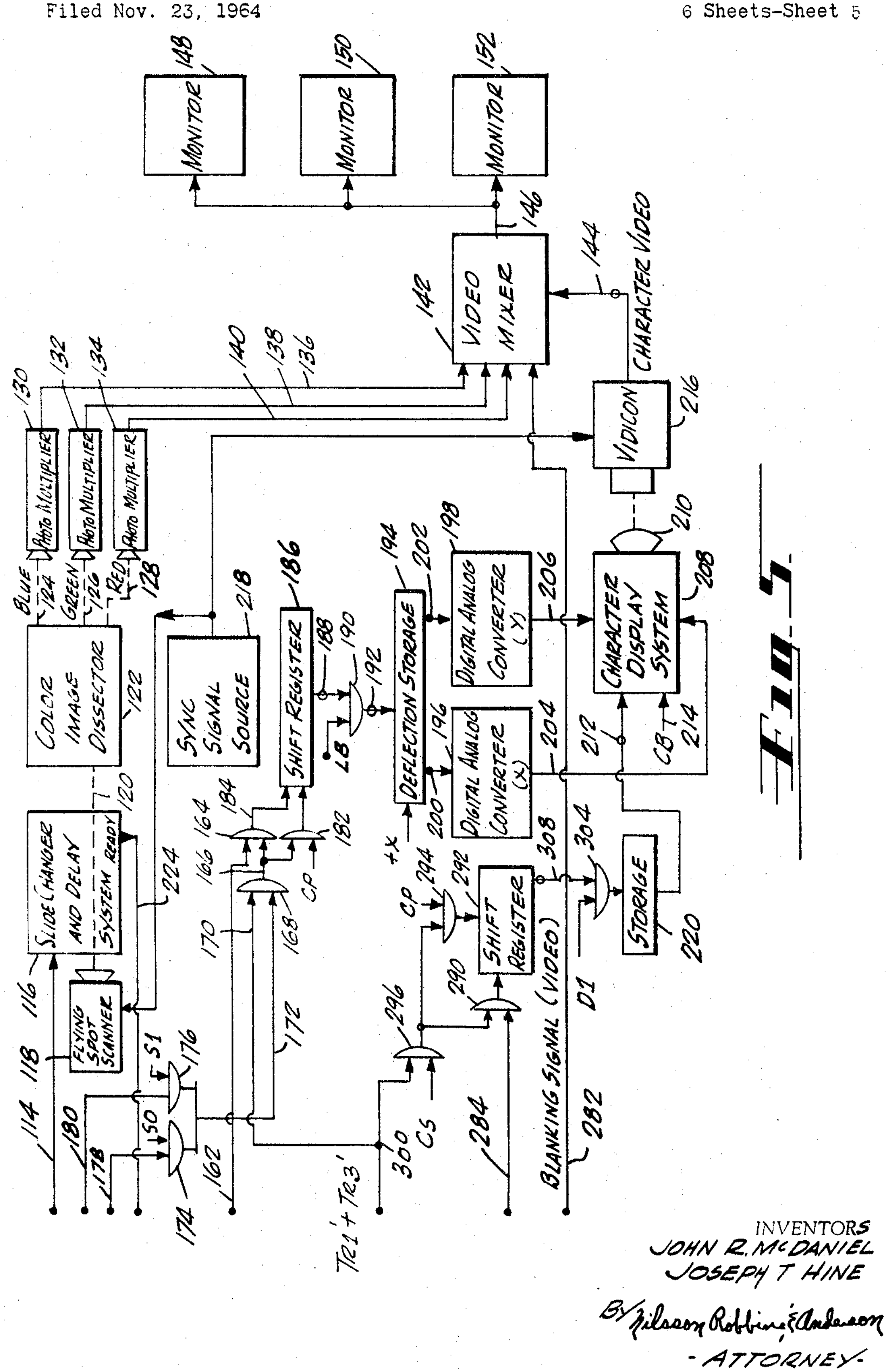
Figure 6:
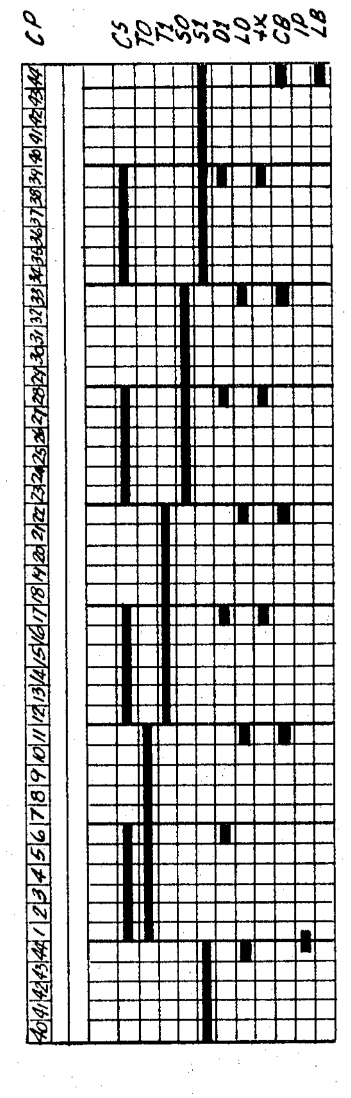

FIGURES 4 and 5 jointly provide a diagrammatic representation of a system constructed in accordance with the present invention;

FIGURE 6 is a timing chart illustrative of the sequence of operation of a system constructed in accordance with the priniciples of the present invention; and FIGURES *7a* and *7b* are diagrams illustrating the format of code words used in the system of FIGURE 1.

In referring to the figures in greater detail, it is stressed that the particulars shown are by way of example only and for purposes of illustrative discussion, and are presented in the cause of providing what is believed to be a useful and readily understood description of the principles and structural concepts of the invention. In particular, no attempt has been made to show structural details of the apparatus in more detail than is necessary for the fundamental understanding of the invention, the description taken with the drawings making apparent to those skilled in the art of electronic computers and ouput display systems, techniques by which several forms of the invention may be constructed and embodied in practice. In addition, the detailed showing is not to be taken as a limitation upon the scope of the invention which is defined by the appended claims, forming along with the drawings, part of this specification.

In FIGURE 1, a portion of the cabinet 12 is shown, which houses an examplary system hereof, with a front panel 14 containing a control panel 16 and a visual-output display face 18. In the illustrative form hereof, the display face comprises the image target of a color television tube upon which static and dynamic data is combined for presentation.

Considering the face 18 as shown in FIGURE 1, an exemplary display of the system is illustrated. The display includes flow paths 20, 22 and 24 interconnecting certain blocks presented in the display. The flow path 22 includes a symbol 26 representing a valve while the flow path 24 carries a similar symbol 28. A box 30 is provided adjacent to symbol 26 while a box 32 is presented adjacent the symbol 28. Other boxes 34, 36, 38 and 40 are also shown connected to the paths. This portion of the display represents static data as from a color slide, and is specifically a flow diagram upon which dynamic data may be effectively presented for easy visual perception. For example, the state of the valves represented by the designations 26 and 28 may be indicated to be either "open" or "closed" by providing such designations in the boxes 30 and 32. Further, the quantity of fluid available to the system may be manifest alphanumerically within the box 38, while the temperature of a portion of the process may be indicated in the box 36 and the rate of flow through the path 20 may be indicated alphanumerically in the box 34. Thus, the basic diagram or schematic is fixed in the design for manifesting certain variable or dynamic data so that the combination is readily perceivable to an opertor. In this regard, the presentation shown is merely illustrative and may comprise a graph, flow chart, block diagram, and so on, while the dynamic data may take alphnumeric forms or virtually any other symbolic representations to manifest changing data in cooperation with the static display.

In general, one single display manifesting static data is not adequate for use in conjunction with a process control system. Therefore, a number of different static presentations are provided, which are capable of functioning with selected data to best depict various status conditions selected for observation. As described in the illustrative system, the different background displays (static data displays) are provided by photographic color slides. In this regard, it is to be noted that the flow paths, boxes and designations presented on the face 18 may be of different colors to provide greater flexibility or enhance the effectiveness of the display. Thus, by employing photographic storage, a prodigious quantity of information is conveniently stored which is most impressive when compared with the storage capability that would be required of a binary elemental system.

In the operation of the system as described herein, the various photographic slides carry different static displays are identified by number. In this regard, the number of the slide in display is manifest by a visual register 42 on the front panel 16.

A slide to be displayed may be selected either by the computer or by the operator. A toggle switch 44 adapted with push buttons is provided on the control panel 16 so that the operator may set the system for computer selection or may select the slides manually. Manual selection is accomplished by three dials 46, 48 and 50 may be set to identify the desired slide number. Next, an "enter" button 52 is depressed to accordingly set the register 42 which in turn accomplishes: the selection and display of the desired photographic slide; the selection from the computer (or other data-processing system) of the dynamic data to be displayed; and further, the display of the dynamic data in significant locations on the face 18. As a result, the operator is presented with displays of output data which he may readily comprehend, and which are current indications of a real-time process. As a result, the operator may exert overriding control upon the process if necessary or desirable.

Figure 2:
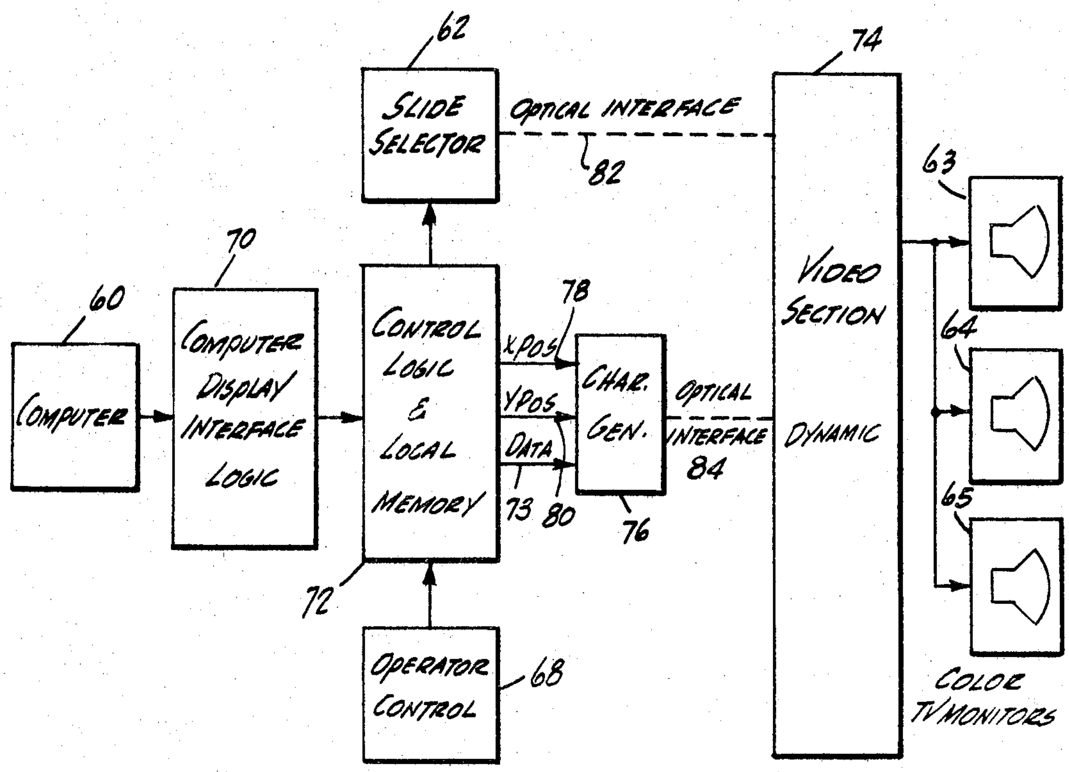
FIGURE 2 is a diagrammatic representation of a simplified form of the present invention.

Preliminary to a detailed consideration of the illustrative system disclosed herein, the simplified diagrammatic representation of FIGURE 2 will be considered. The system shows a computer 60 which may take a wide variety of forms including: process control monitors, specifically-programmed general purpose computers, or any of a wide range of special purpose computers.

The computer 60 contains various signals indicative of alphanumeric or other information which is to be displayed in particular locations so as to provide particular significance to such information. The computer may, for example, contain signals representative of a particular measurement or status which is to be displayed in a particular block of a static display to provide the desired association. The static displays are contained as a group of photographic slides in a slide selector 62. Thus, in function, the system accepts alphanumeric signal information from the computer 60 and optical information from the slide selector 62, to combine the static and dynamic information in a display which may be imaged upon a plurality of variously located color television monitors 63, 64 and 65.

In the operation of the system, the image carried on a photographic slide is dissected to be reduced to a video signal. The computer then provides alphanumeric signals which are also converted into a video signal form, after selective positioning, so that two video signals may be mixed to develop a composite color video signal for the monitors 63, 64 and 65.

In the operation of the system, the slide to be displayed may be selected either by a manual operator control 68, or alternatively by the computer 60 acting through interface logic 70. In any event, a control system embodied in a logic and memory block 72 receives and registers a number designating the particular slide to be displayed. The designation is then passed from the block 72 to the slide selector 62 which seeks the proper slide and displays it to a video section 74 which scans the slide for dissection into a video signal.

The specification of a particular slide to the control and memory block 72 also designates particular locations in the video pattern which are to contain dynamic data representations. That is, for example, the selected slide may contain a block in the upper right hand corner in which a numerical value is to be displayed in accordance with the content of the particular register in the computer 60. In such an instance, the numerical value is passed from the computer 60 through the logic block 70, the block 72, and a channel 73 to a character generator 76 which provides an optical presentation of the desired data (one character at a time) in the desired location in the display. The character generator 76 receives deflection signals through channels 78 and 80 from the block 72 to position each character in the appropriate location.

The alphanumeric or other symbolic representation provided by the character generator 76 is then scanned in synchronism with the scanning of the selected slide so that a composite data video signal is developed in the video section 74 for the monitors 63, 64 and 65. As disclosed herein, the video monitors 63, 64 and 65, the various components of the video section 74 and the character generator 76 are constructed in accordance with generally-accepted television techniques. Thus, somewhat standard compatible components have been adapted for use in the system or used substantially as they are available on the market. Specifically in this regard, the color television monitors 63, 64 and 65 may generally be standard.

As will be disclosed hereinafter, the static display video signal developed through the optical interface 82 as shown in FIGURE 2, may be derived utilizing a flying spot scanner as well known in the television art for converting a color transparency into a color video signal. The provision of the dynamic images through the optical interface 84 is accomplished by focusing a vidicon or various other video-signal generating systems upon the character generator 76 which displays the alphanumeric or other symbols in desired positions to register with the static display.

Figure 3:
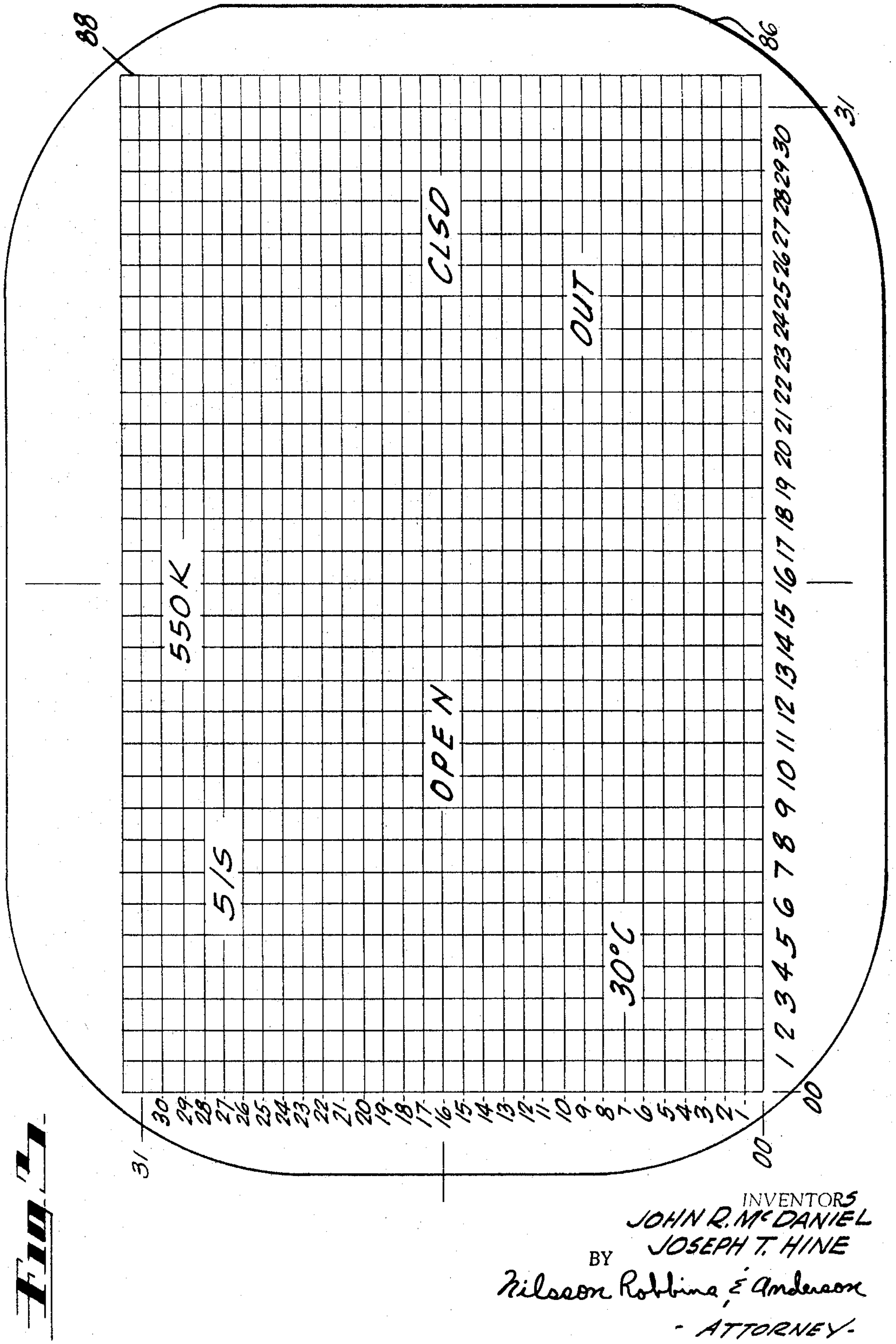
FIGURE 3 is a diagrammatic representation of one portion of the output data as may be visually presented by a system construced in accordance with the principles of the present invention.

As indicated above, the actual values or information contained in the dynamic display are registered in the memory of block 72 and periodically updated by the computer 60. However, the signals for positioning the symbols or alphanumeric data for coincident registration on the display face of the character generator 76 are recorded in the memory of block 72 in permanent association with the display slides. Considering this registration further, FIGURE 3 diagrammatically illustrates the genertaion and positioning of dynamic alphanumeric information on the face of the character generator 76 (FIGURE 2) to accomplish the display as shown in FIGURE 1. That is, the variable data signals for registered placement in the various blocks indicated in FIGURE 1 are shown in FIGURE 3 as generated on the face of the character generator 76.

The character generator 76 may take a variety of forms as will be hereinafter considered including electron beam devices incorporating means to provide an excitation pattern coinciding to a desired symbol, and means to position the excitation pattern as desired on the tube face. Such generators are well known in the prior art to afford a display of alphanumeric characters as shown on the face 86 in FIGURE 3 (less the grid pattern 88). The grid pattern 88 provides a set of rectangular coordinates of some thirty-two divisions with the result that a pair of five bit binary registers (horizontal and vertical) may establish the initial position of any four-character word. For example, the representation "550K" as shown in FIGURE 3 is accomplished in the positions shown by a vertical deflection register manifesting a value of twenty-nine and a horizontal deflection register manifesting a value of fourteen. The result as indicated, initiates the alphanumeric word at the coincidence point of the horizontal and vertical registers. The permanence of the tube phosphor permits the provision of many characters appearing simultaneously as well known in the art.

In providing the composite display on the face of a color television tube, as indicated above, the static or background portion of the display is derived from a photographic slide while the dynamic or alphanumeric data is provided from a computer. Referring back to FIGURE 2, it is to be noted that although the data from the slide selector 62 representing the background portion of the display is somewhat continuously supplied from the slide selector 62, the dynamic data from the computer 60 is stored in the memory section of block 72 which serves as a buffer holding the data until the appropriate time of display. Therefore, a select information transfer is accomplished between the structure in block 72 and the computer 60. Specifically, the identification or address of the desired information is provided from the memory of the block 72 to the computer 60 to command particular dynamic data signals. Thereafter, the computer transfers these signals back into the memory of the block 72 from which they are repeatedly applied to the character generator 76 to form the desired characters at the appropriate times and in the proper locations. It is to be recognized, that the sequence of transfer: identification signals to computer, data signals from computer, and data signals to character generator, may be variously accomplished and implemented both with respect to timing and structure. Therefore, the system as set forth in FIGURES 4 and 5, to which reference will now be had, is understood to be merely exemplary of one form of the invention hereof. In general, conventional symbols are employed in FIGURES 4 and 5 to represent somewhat standard circuits as flip-flops, "and" gates, "or" gates, as well as blocks as identified. It is to be understood, that virtually any structures for such elements (many forms of which are well known in the prior art) may be compatibly employed in the system hereof.

Centrally located in FIGURE 4, is a magnetic drum 92 mechanically coupled to a motor 94 which rotates the drum at a substantially constant rate. The drum 92 is coated with paramagnetic material as well known in the prior art, and operates in conjunction with many electromagnetic heads as considered below, as a multiple channel storage system.

In one operating embodiment, the drum revolves synchronously at sixty revolutions per second, and peripherally accommodates sixty-five words, each of forty-four binary bits. The annular channels of the drum are then divided into three groups, specifically, a timing group 96, a data group 98 and a identification and deflection group 100. The identification and deflection channels, group 100, number forty-six in one operating embodiment of the system, each of which includes sixty-five words or sectors as indicated above, with each sector providing identification signals and deflection signals for two alternate forty-four-bit display words. The format of these words will be considered in greater detail below; however, it is here important to appreciate that selection of the particular slide identifies a particular channel in the group 100 which then provides signals to address the desired data from the computer.

The channels on the drum in group 98 serve to register the data signals somewhat as a buffer storage. That is, the data signals are provided from the computer to the storage channels of group 98, from which the data signals can be drawn until a change occurs either in the slide being displayed or the dynamic data, at which time the computer functions to update the contents of storage locations in group 98.

The two channels 102 and 104 in group 96 provide timing signals for the operation of the system. Specifically, the channel 102 provides clock pulses which occur regularly with the rotation of the drum 92, to define binary bit locations as well known in the art, and as identified as signals CP as shown in FIGURE 6.

The channel 104 provides index pulses IP, as shown in FIGURE 6 which occur once with each revolution of the drum 92. Therefore, the clock pulses are sensed by the channel 102 by a read-head 106 and applied to a timing signal generator 108. In a somewhat similar fashion, the index pulses are sensed from the channel 104 by a read-head 110 and applied to the timing signal generator 108.

The timing signal generator 108 includes logic circuits and counters as well known in prior art to develop and provide each of the output signals indicated to pass therefrom, and as graphically shown on a time base in FIGURE 6. Specifically, these signals are set forth below in a chart along with the signals CP and IP, and also along with the timing function of each signal.

| Signal: | Timing function |
|---|---|
| CP | Clock pulses (44 per drum word). |
| IP | Initial or index pulse (1 per drum revolution). |
| LB | Last bit of word (1 per word). |
| CS | Read and record data code groups to and from drum. |
| T1 | Read I.D. numbers from drum (odd slides—1XX). |
| T0 | Read I.D. numbers from drum (even slides—0XX). |
| S0 | Read deflection codes from drum (even slides—0XX). |
| S1 | Read deflection codes from drum (odd slides—1XX). |
| D1 | Transfer data code group to storage register. |
| +X | Increment deflection register +1. |
| CB | Print character. |
| LD | Load code groups. |

The detailed timing operations of each of the signals set forth above, will be considered in the course of explaining the operation of the system and along with reference to the timing chart of FIGURE 6 as well as the structural presentation of FIGURES 4 and 5. In this regard, a detailed understanding of the system may now be best accomplished by assuming a certain status of operation, and describing sequences of events somewhat coincidentally with the introduction of the elements serving to accomplish various functions. Therefore, assume that the system as shown in FIGURES 4 and 5 is operating with a selected slide number in a slide register 112 (top center of FIGURE 4). The slide register may include three bits, two of which are decimal with the most significant being binary. Furthermore, the slide register 112 may be incorporated as a portion of the display register 42 as shown in FIGURE 1.

The slide register 112 provides a set of parallel binary signals in a cable 114 which is connected to a slide changer and delay system 116 (FIGURE 5). It is to be noted, that lines representative of cables and conductors terminating at the right of FIGURE 4 continue at the left in coincidence on FIGURE 5.

The slide changer and delay system 116 stores a number of photographic slides which may be color or black and white, and selects a particular slide for display as identified by the signals received through the cable 114. Slide changers capable of accomplishing this function are readily available on the market.

The slide changer system displays the selected slide for illumination by the flying spot scanner 118 as widely used in the television industry to scan a light beam in a raster pattern over an image, to dissect the image into a video light signal. The light signal indicated by a beam 120 from the system 116 in the flying spot scanner 118 is received by a color image dissector 122 which comprises an optical beam-splitting system as widely used in the color television arts for dividing a composite color beam into component beams of blue, green and red color. The component color beams are represented by lines 124 for blue, 126 for green, ad 128 for red. The beams 124, 126 and 128 are applied to photomultipliers 130, 132 and 134 respectively, as widely used in the television arts, which serve to convert the component color beams into representative video signals provided to conductors 136, 138, and 140 respectively, which are connected to a video mixer circuit 142. The combination of component color signals into a standard television signal is well known in the television art and a variety of circuits are suitable for accomplishing such combination. Any of such circuits may be employed as the video mixer 142, as shown in FIGURE 5. The video mixer 142 also receives blanking and timing signals through a cable 144 (hereinafter considered) so as to provide a conventional video color signal on an output conductor 146 which is coupled to television monitors 148, 150 and 152 to provide a presentation as shown in FIGURE 1, for example. Of course, the selection of three television monitors is entirely exemplary, and in fact, the number and location of these monitors may vary widely depending upon the function of the total system. Therefore, the flying spot scanner 118 in conjunction with the slide displayed by the system 116 provides the color beam 120 representative of a raster scanner, to the color image dissector 122 which separates the beam into composite colors for conversion to electrical signals by the photomultipliers 130, 132 and 134. The composite signals are then combined with timing and blanking information in the video mixer 142 to provide a signal commanding a static display on the face of each of the monitors 148, 150 and 152 pictorially representing the selected slide displayed in the system 116.

In providing the dynamic data representations in the display, as shown in FIGURE 3 the first alphanumeric character or symbol of each possible four-symbol word is sensed from one of the channels in group 98 on the drum 92 and displayed in a location on a character display system face in accordance with deflection signals previously sensed from the selected word of the channels in group 100 of the drum 92. More specifically, the deflection is established during one-word time (44 clock pulses) of the drum 92, then during the following word time four alphanumeric character or symbol signals are provided and displayed. Thus, in the complete revolution of a drum, sixty-five possible four-symbol alphanumeric words are presented for display. Of course, in most displays far less than that number will be employed and as shown in FIGURE 1, only six alphanumeric words are displayed.

Considering the operation of the system in further detail, the slide register 112 provides signals in a cable 154 which designate the selected slide and actuate a relay matrix 156 to connect one conductor in a cable 158 from a selected one of the drum heads 160 to an output conductor 162. The relay matrix 156 may comprise a well known relay pyramid, or alternatively a diode gating system for accomplishing the selective interconnection. In effect, this interconnection selects one of the forty-six channels in the group 100 to provide a serial output to the conductor 162. Therefore, sixty-five code words are sequentially received by the conductor 162 from the selected drum channel.

Figures 7A, 7B:
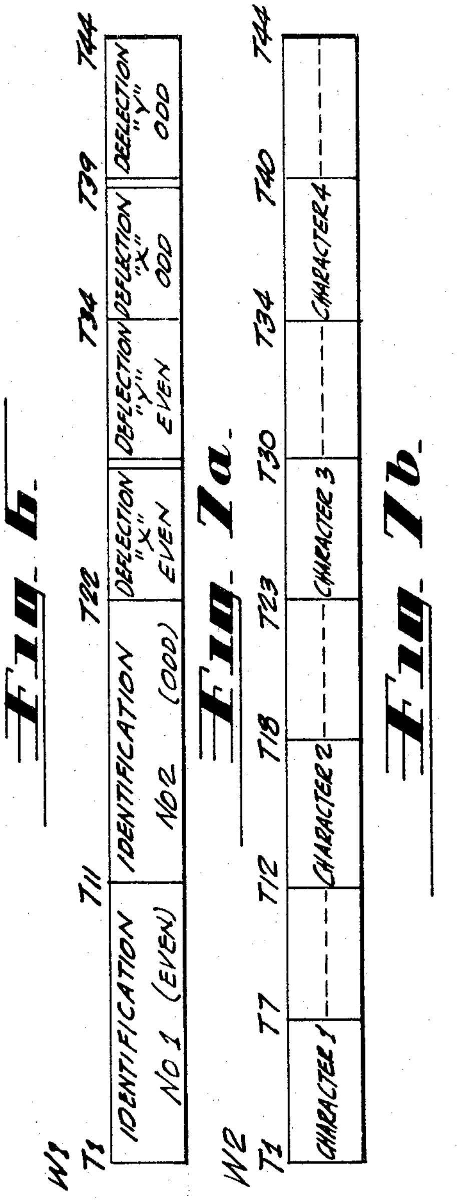

The format of the words is shown in FIGURE 7*a* and each includes signals for two separate slides. That is, each of the forty-four-bit words includes an identification or address signal for an odd and an even slide number, as well as deflection information for an odd and an even slide number. Therefore, the most-significant bit of the selected slide number (a binary bit) is employed to determine whether the odd or the even segments of the selected words function to actuate control. The utilization of the identification portion of the words (bits 1 through 22) is considered below. However, the deflection information contained in the bits 22 through 44 of the code words are applied through the conductor 162 to an "and" gate 164 (FIGURE 5). The "and" gate 164 receives a signal through another input conductor 166 which controls the operation of the gate 164 to pass the selected deflection signals from the code words in accordance with whether the current slide number is odd or even (1 or 0) in the most-significant digit. Specifically, the conductor 166 receives the output of an "and" gate 168 having a first input to a conductor 170 which carries a high signal during periods of dynamic display, as will be explained below. The "and" gate 168 also receives a signal through a conductor 172 which carries the selected signal S0 or S1 depending upon whether or not the most-significant digit of the slide number is 0 or 1. This selection is accomplished by a pair of "and" gates 174 and 176 coupled to the slide register 112 (FIGURE 4) through conductors 178 and 180 respectively (FIGURE 5). If the most-significant digit of the selected slide number is 0, the conductor 178 carries a high two-state signal while the conductor 180 carries a low value for a two-state signal. Of course, the converse registered value results in the negation of the signals indicated. Therefore, if the selected slide number is even, the gate 174 provides a high output during the period defined by the signal S0 (FIGURE 6) coinciding to pulses 22 through 33 of the code word. Alternatively, if the selected slide number is odd (most-significant digit is 1), the gate 176 is qualified during the period of signal S1 resulting in a high signal in the conductor 172 during the period of pulses 34 through 44.

The output signal as described above from the gate 168 is applied to the gate 164 and to a gate 182 which also receives clock pulses CP. As a result, the gate 164 passes the selected deflection signals through a conductor 184 during the period of the signal S1 or S0 to indicate the X and Y deflection by two five-bit code words, each of which is capable of manifesting thirty-one coordinate positions.

The gate 182 provides pulses during the selected interval which step the deflection signals into a shift register 186 as well known in the computer art and which may comprise magnetic cores or various other binary devices. At the completion of the stepping operation which coincides to the end of a word, the contents of the shift register are moved in parallel through a cable 188, a set of parallel "and" gates 190, and a cable 192 into a deflection storage register 194. The gate 190 which is really a composite of many gates, has each element qualified by the signal LB occuring at the termination of a word as shown in FIGURE 6. Therefore, at the end of a word, passing under the heads 160 communicating with the drum 92, two selected deflection words of five binary bits each are registered in the deflection storage register 194. The register may comprise ten binary bits of storage, with the least significant five binary locations containing the X coordinate deflection value and the most-significant five binary locations registering the Y deflection signals. The two sets of deflections signals are applied to a pair of digital-analog converters 196 and 198 respectively through cables 200 and 202. The digital-analog converters are circuits well known and widely employed in the instrumentation arts and provide analog voltages in output conductors 204 and 206 respectively from the converters 196 and 198 which manifest in amplitude the binary significance of the values registered in the register 194. The signals carried in the conductors 204 and 206 are applied to a character display system 208, which may comprise any of a variety of structures for providing an alphanumeric display on a face 210 in accordance with deflection signals provided by conductors 206 and 208. One form of apparatus satisfactory for the character display system is a tube well known in the data processing arts termed "characteron." Alternatively, the character display system may comprise any other structure which displays a selective symbol in accordance with signals carried in a cable 212 upon the occurrence of a pulse signal CB applied to a conductor 214. The provision of the signal in the cable 212 is to identify a select character. However, the above description establishes the appearance of a select character in a predetermined location on the face 210 in accordance with the deflection signals received from the drum 92.

The face 210 is sensed by a vidicon 216 which is one well known form of television camera. Therefore, the vidicon provides a video signal along with blanking and synchronizing signals through the cable 144 for mixing with the color video signal to provide a composite video signal. It is to be noted, that the vidicon 216 and the flying spot scanner 118 receive synchronizing signals from a sync signal source 218 as well known in the prior art. Therefore, the video signals formulated of the color slide are synchronized with the video signals representing the dynamic character display.

With reference to the timing of the character display system 208, the deflection signals are provided during the word prior to the word containing the actual display signals. That is, as shown in FIGURE 7, the word W1 carrying the deflection signals precedes the word W2 taken from the channels in group 98 on the drum 92 so that the deflection is established during the word prior to the actual display. The display is accomplished by the signal CB which occurs after symbol-defining signals are received from the drum into a storage register 220 as will be described hereinafter. However, it is to be noted that during one word time or period, four symbols or characters are to be displayed. Therefore, after the display of the first character, a signal +X as indicated in the timing chart of FIGURE 6 is applied to the deflection storage register 194 to advance the horizontal deflection signal by a single level of magnitude. Thereafter the deflection is proper for the display of the next symbol. Considering an exemplary operation in this regard, assume the desirability of displaying the code word "550K" as shown at the top of the display of FIGURE 3. As will be noted from the grid of FIGURE 3, the position of the exemplary code word requires a horizontal displacement of "14" and a vertical displacement of "29." Therefore, initially, signals are placed in the binary storage register 194 to accomplish such component deflection as described above during a particular word time. Then, during the next word time while such deflection signals are active to position the symbol displayed by the character display system 208, the first character "5" is represented by signals in the storage register 220 and applied to the character display system 208 to be manifest on the face 210 in the select location during the pulse signal CB.

With the accomplishment of the display "5" the portion of the deflection storage register 194 is incremented upon the occurrence of the signal +X as shown in FIGURE 6. Also, during the period of the signal CS and the signal D1, a new set of symbol-representing signals are placed in the storage register 220 as will be hereinafter described. In the assumed example, the signals contained in the register 220 still indicate the numeral "5" however, the deflection signals indicate a position to the right one level of magnitude which receives the display on the occurrence of the signal CB to accomplish the second symbol in the four-symbol set. In a similar manner, the symbols "O" and "K" are set up and displayed all during one word time. These signals are derived from the drum section containing group 98 channels which provide an output word format as indicated in FIGURE 7*b*. In this regard, it is to be noted that the four symbols are contained in four distinct six-bit locations in the word.

Considering the manipulation of the character words from the computer to the storage register 220, reference will now be had primarily to FIGURE 4. The manipulation of the data words involves three separate transfer operations as disclosed in the illustrative embodiment hereof. Specifically, the identification signals which locate the desired data are first transferred from the group 100 of channels on the drum 92 to the computer 222 shown in the upper left hand corner of FIGURE 4. This operation occurs only upon the insertion of a new slide number into the slide register 112.

The next transfer involves the movement of the data signals from the computer 222 to the buffer storage provided by the group 98 of channels on the drum 92. This operation occurs either after a fresh slide is called for by the contents of the register 112 or upon the computer 222 manifesting the presence of fresh data which should replace prior data contained in the buffer storage.

The third transfer operation involves application of the data signals from the buffer storage, i.e. the channels in group 98 on the drum 92 to the display system in coincidence with the accomplishment of proper deflection in such system. Normally, the latter transfer occurs somewhat continuously and repeats unless one of the prior-described transfers are in process during which time the video display is blanked as disclosed below.

These individual information-transfer operations will now be considered in detail assuming as an initial operation the presence of a fresh slide-identifying number in the register 112.

When a new number is placed in the slide register 112, the slide changer and delay system 116 (FIGURE 5) immediately acts to select the identified slide and place it in a display position. Thereafter, following the brief interval of delay, the slide changer provides a signal in conductor 224 which may comprise a pulse derived from a motor, a relay or various other structure in the slide changer. The pulse appearing in the conductor 224 is applied to set a flip-flop TR1 (FIGURE 4), the set state of which defines a first stage of transfer operation. Essentially, this period is awaiting interval of variable time during which the system awaits the index pulse signal IP indicating the start of a completing drum revolution. Upon the occurrence of the signal IP, in coincidence with the set state of the flip-flop TR1, the "and" gate 226 is qualified to set a flip-flop TR2 initiating the second stage of gated transfer operations. At the instant when the flip-flop TR2 is set, the first word in the selected channel of the group 100 is just beginning to pass under the read-heads 160. The operation of the system now functions to select the desired identification data from each word in the selected channels and apply that identification data to the computer 222 so that the computer may retrieve the data desired. Of course, the identification signals identify locations in the computer which are pertinent to the static display which is to be presented.

Referring to FIGURE 7*a*, it may be seen that each of the code words sensed from the select relay 156 as previously described include two identifications, e.g. identification number 1 for even numbered slides in the bit positions T1 through T11 and identification number 2 for odd numbered slides in bit positions T12 through T22. In this regard, the indication "odd" or "even" manifests the most-significant digit of a slide identification number as either a 0 to a 1. Therefore, if the most-significant digit is a 1, the identification numbers must be taken from the bit positions T12 through T22 of each word whereas if the most-significant digit of the slide number is a 0, the bit positions T1 through T11 are to be sensed. This distinction is accomplished by a pair of "and" gates 230 and 232 (FIGURE 4) which are connected to receive two-state signals indicative of the most-significant digit registered in the slide register 112. In this regard, the received signals are carried in conductors 178 and 180, are negation signals and in cooperation with the timing signals T0 and T1 as indicated in FIGURE 6 serve to qualify one of the gates during either the interval of signal T1 or T0. Of course, the signal T0 occurs from clock pulse time 1 through clock pulse time 11 whereas the signal T1 occurs from clock pulse 12 through clock pulse 22.

The output conductors from the gates 230 and 232 are both coupled through a conductor 234 to a pair of "and" gates 236 and 238. These gates also each receive a signal which is high during the set state of the flip-flop TR2, through a conductor 240. Therefore, the gates 236 and 238 are qualified during the second stage of the transfer operation or when the flip-flop TR2 is set, and during the portion of each word time when identification signals as desired appear in the conductor 162. These signals are applied through the gate 238 to the shift register 242 while clock pulses CP are applied to the register through the gate 236. As well known in the computer art, the shift register 242 then functions to step the identification number represented by binary signals into binary stages in synchronism with the clock pulses CP.

After an identification number occupying eleven binary bits is placed in the shift register 242, during each word time, it is next applied to the computer 222 through an "and" gate 244 upon qualification by the signal LB which is the last pulse in a word time. The gate 244 is really a composite group of gates for accommodating a parallel transfer so that eleven bits are transferred in parallel from the register 242 through a cable 246, the gate 244 and a cable 248. The eleven bit transfer concluded in each word of a drum revolution is then placed in the computer which functions to address data locations in accordance therewith. Of course, the computer 222 may take a wide variety of forms including any of several general-purpose computers readily available on the market at the present time. In general, the computer receives the identification numbers, seeks out the desired code words and places the code words or data in a buffer storage location. In this regard, it is to be noted, that for each identification number supplied to the computer, a four word set of signals will be provided. Of course, each of the four words (comprising six bits) specifies a particular symbol so that eventually a four-character symbolic word is provided.

At the conclusion of the drum cycle during which the identification numbers are supplied to the computer 222, the flip-flop TR2 is reset through an "and" gate 250 which also resets the flip-flop TR1. Specifically, the signal from the flip-flop TR2 indicating a set state and providing a high value of a two-state signal in the conductor 240 when the flip-flop TR2 is set, is applied to the gate circuit 250 along with the signal IP. Therefore, after the flip-flop TR2 is once set at the start of a drum revolution, the initiation of the following drum revolution as manifest by the signal IP qualifies the gate 250 providing a high signal in a conductor 252 to reset both the flip-flops TR1 and TR2. Thereafter, the system goes into a waiting stage, during which the computer 222 assembles the desired data in a buffer storage location for transmission to the drum 92. In this regard, the mode of operation of the computer 222 is not significant to the present invention requiring discussion of such mode in detail and is therefore not considered. However, in general, various applications of the system will include a computer in which an output signal is provided as on a conductor 254 to manifest that the desired data is ready to be provided from the computer. In this regard, a high signal is also supplied to the conductor 254 at a time when the prior data provided by the computer is to be updated. That is, the computer program may involve a periodic comparison of current data with prior data and upon occurrence of significant change, the computer will revise the data in its buffer storage and provide a high state output signal in a conductor 254 to initiate another interval of data transfer.

Upon the occurrence of a signal in the conductor 254, the flip-flop TR3 is set to provide a high output in a conductor 256. The system then enters a waiting interval during which the drum travels to the first word recorded thereon. Upon the occurrence of the beginning of the first word, the signal IP is provided to qualify an "and" gate 258 which sets the flip-flop TR4. Just as with the flip-flop TR2, the flip-flop TR4 is set for precisely one revolution of the drum and then reset through an "and" gate 260 which is qualified by the output from the flip-flop TR4 applied through a conductor 262 and the pulse IP.

Therefore, the flip-flop TR4 is provided in a set state for precisely one drum revolution and it is during that drum revolution that each forty-four-bit word time of the drum may receive and register four six-bit symbol words. These words are transferred in sequence from the computer 222 upon receiving a "go" signal in a conductor 263. The data signals or six-bit words are transferred in parallel from the computer 222 through a cable 265 which is connected to a composite gate 267 comprising a plurality of individual "and" gates each of which is qualified by the high state signal of the flip-flop TR4 applied through a conductor 269 and a signal LD from the time signal generator. Therefore, during the timing interval established by the pulse signal LD, a six-bit parallel word is entered in the shift register 266 through the composite gate 267. Thereafter, the contents of the shift register 266 is stepped out in serial form during the period of the signal CS to be entered in one channel of the drum 92. It is to be noted, that the entry of the data words in the shift register 266 and their transfer onto the drum 92 all occurs during a single revolution of the drum. To accomplish the timing relationship, it may be desirable to provide the clock pulse signal CP to the computer 222; however, synchronizing methods are also available that do not involve the clock pulses.

The six-bit data words in binary form are stepped out of the shift register 266 to be recorded on the drum 92 by clock pulses CP which are passed by an "and" gate 268 during the period when the flip-flop TR4 is in a set state and during the period of signals CS as shown in FIGURE 6. That is, during the interval of the timing signal CS, clock pulses step the contents of the shift register 266 through a select relay system 272 and one conductor of a cable 274 into one channel on the drum, recorded by means of one of the heads 275. In this regard, a group of heads 275 are provided for communication with the group 98, of storage channels; however, only a single one of the channels and the heads is used during an actual operation. However, it has been found advantageous to provide additional channels in the group 98 for testing and alternate use.

Selection of the particular channel in the group 98 is accomplished by the relay system 272 which may be manually controlled by a switch circuit 276. In this regard, the select relay system 272 may comprise a relay pyramid or other well known structure for selectively connecting one conductor in the cable 274 to receive output from the shift register 266. In this manner, the code words each of six-bits and each stored in spaced apart positions in a forty-four-bit word location on the drum 92 are placed for subsequent use in accomplishing the display. It is to be noted, that the information transfer just described may be initiated either by a fresh slide being displayed or by the computer 222 determining that revised data should be presented in view of a significant change or other criterion. Of course, either of these events causes the computer 222 in accordance with its program to provide a signal in the conductor 254 which initiates the data transfer described.

Before considering the transfer of the data signals to select a desired character in the character display system 208, it is to be noted, that during the interval when either of the flip-flops TR1 or TR3 are set, a signal is provided in conductor 282 which carries a blanking signal to the video mixer 142. Of course, blanking is a well known technique in a video mixer circuit and essentially the presence of a signal manifesting a set state for one of the flip-flops TR1 or TR3 in the conductor 282 blanks the output of the video mixer 142 providing "blacker-than-black" output or essentially no output. This operation halts any display of dynamic data while such data is undergoing change or updating.

During the display operation of the system, which occurs essentially during all intervals except when either the flip-flop TR1 or the flip-flop TR3 is in a set state, six-bit data code groups are read from the drum 92 passed through the selector relay system 272 and the conductor 284 to be passed by a gate 290 into a shift register 292 (FIGURE 5). The stepping operation of the shift register is controlled by an "and" gate 294 in coincidence with the receipt of data through the "and" gate 290. The gates 290 and 294 are both qualified by a signal from an "and" gate 296 which receives the timing signal CS manifesting the interval of transfer of the data groups and a pair of signals from the flip-flops TR1 and TR3 indicating they are in a reset state received in a conductor 300. Referring to the flip-flop circuits TR1 and TR3, when in a reset state, they provide a pair of signals TR1' and TR3' in a high state. As indicated in FIGURE 5, these signals are applied to a conductor 300 to qualify the gate circuit 296 which in turn permits the transfer of six-bit code groups to the shift register 292 during the period of signal CS under clock pulse stepping through the gate circuit 294.

After the six-bit code group is registered in the shift register 292, it is transferred through an "and" gate 304 into a storage register 220 as previously described to control the character display system 208. The gate 304 is actually a composite "and" gate including six individual "and" gates each operating in cooperation with one conductor in a six-conductor cable 308 and further receiving a qualifying input as a timing signal D1. Thus, the six-bit data code groups each manifesting a particular alphanumeric symbol are placed in the storage register 220, to control the character display system 208 so that upon the occurrence of the timing signal CB the character display system manifests a visual image of the identified symbol in the location specified by the deflection signals as previously described. Also as previously described, the displayed character is sensed as a video signal by the vidicon 216 to be combined with static information and thereby manifest by one of the color television monitors 148, 150 or 152. As a result, it is apparent that an effective visual display is substantially continuously provided insofar as human perception is concerned, preserving the operator well informed of the phenomena or system under observation. However, in this regard, it is to be noted that the system may be controlled manually rather than by the computer 22 by opening a switch 310 (top of FIGURE 4) to disable the computer and employing a manual set arrangement 312 to provide the desired slide number as shown in FIGURE 1. Of course, the manner of using the system will depend largely upon the particular application, and the intended function of the human operator in the overall system.

Prior to using the system hereof, it is necessary to record the data upon the drum 92 for coincident use with preselected static displays carried on photographic slides, for example. This recording operation is accomplished in the group 100 of channels by employing a manual selection section 325 to set the selected relay system 156 and coupling the selected conductor in the cable 158 to a magnetic tape recorder or other information source carrying the desired signals which may be synchronized to the movement of the drum 92. A similar operation is repeatedly performed for each of the channels to be employed so that the identification numbers and deflection signals as shown in FIGURE 7*a* are properly recorded for each word position in the channels.

It is to be readily understood, that though the system hereof provides an effective data display means, various changes may be easily accomplished in the basic operating format or in the operating structure as disclosed herein. In this regard, it is to be understood that the scope hereof shall be defined not in accordance with the description set forth herein, but rather in accordance with the claims set forth below.

What is claimed is:

1. A visual data display system for providing static data and related dynamic data in a composite display, comprising:

means including a light image face for providing plural static background displays on said image face in accordance with said static data;

means for providing plural sets of signals representative of said dynamic data, each of said sets being identified with one of said static background displays;

buffer storage means for selectively receiving and storing until ready for utilization a set of said signals representative of said dynamic data;

means for storing sets of deflection signals each of said sets being identified with one of said static background displays, for indicating at least one display location in said background display for said dynamic data; and symbol image means for providing a visual image to be reproduced on said image face and representative of the set of said signals representative of said dynamic data and in an identified select display positioned in accordance with said deflection signals identified with said select display.

2. A system according to claim 1 wherein said means including a light image face comprises a television receiver, a source of plural static background displays and means for selectively imaging said static background displays on said television receiver.

3. A system according to claim 1 wherein said means for storing sets of deflection signals comprises a serial storage means, and means for selectively addressing said storage means in accordance with a selected static background display.

4. A system according to claim 1 wherein said means including a light image face comprises a source of plural static background displays, means for dissecting said background displays into a first color video signal and means for selectively imaging said video signal on said light image face, and wherein said symbol image means for providing a visual image on said image face includes television camera means to provide a second video signal representative of said dynamic data and means for imaging said second video signal on said face.

5. A visual data display system for providing static data and related dynamic data in a composite display, comprising:

means including a light image face for providing plural static background displays on said image face in accordance with said static data;

means for providing plural sets of signals representative of said dynamic data, each of said sets being identified with one of said static background displays;

means for storing sets of deflection signals wherein each of said sets is identified with one of said static background displays, for indicating at least one display location in said background display for said dynamic data;

at least one address register for registering a designation of a select background display;

means controlled by said address register to provide a select background display on said face;

means controlled by said address register to provide a select set of said signals representative of said dynamic data;

buffer storage means for selectively receiving and storing until ready for utilization said select set of said signals representative of said dynamic data;

means controlled by said address register to provide a select set of said deflection signals; and symbol image means controlled by said select set of signals representative of said dynamic data and said select set of said deflection signals for accordingly imaging a corresponding symbol to be reproduced on said image face.

6. A visual display system for manifesting plural background data displays with dynamic symbolic data in select positions thereon, comprising:

background data register means for containing signals to identify a particular background data display;

video display means including an image face and controlled by said background data register means to image a background data display identified by signals in said background data register means;

buffer storage means for selectively receiving dynamic symbolic data under control of said background data register means and in accordance with the signals contained therein;

symbol image means to image symbols represented by said dynamic symbolic data in said buffer storage means on said image face;

deflection data register means for containing signals to position said image symbols on said image face of said symbol image means; and deflection means for selectively positioning said symbols imaged on said face under control of said deflection data register means and in accordance with the signals contained therein.

7. A system according to claim 6 wherein said symbol image means includes a character generator and said deflection means includes deflection storage means for providing deflection signals to said character generator in accordance with the signals contained in said register means.

8. A visual data display system for providing static data and related dynamic data in a composite display, comprising:

a photographic slide register for registering a selected photographic slide identification number therein, and producing a corresponding slide changer control signal and select relay control signal;

a photographic slide changer responsive to said slide changer control signal for positioning a selected color slide in place for scanning and dissection thereof, and producing a slide ready signal when the selected slide is positioned;

means for scanning and dissecting said selected slide to produce color video signals therefrom;

a video mixer having said color video signals applied thereto;

a television monitor connected to said video mixer and producing static display data according to said color video signals mixed by said video mixer and adapted to be applied to said monitor;

a computer having current dynamic data supplied thereto, said computer including an identification data input a dynamic data ready signal output, a go signal input and a dynamic data output;

a multiple channel memory device including a timing channel group, a dynamic data channel group, and an identification data and deflection data channel group, said timing channel group having a clock signal channel and an index signal channel and said identification data and deflection data channel group having recorded identification and deflection data channels corresponding to respective color slides in said slide changer;

a timing signal generator connected to said clock signal channel and said index signal channel, and responsive thereto for generating a plurality of timing control signals therefrom;

an identification data shift register for receiving the identification data from the identification and deflection data channel corresponding to the selected color slide in said slide changer and adapted to provide the received identification data to said identification data input of said computer;

a character display device including a character signal input and position signal input, said character display device producing a displayed character according to the dynamic data provided to said character signal input and positioned according to the deflection data provided to said position signal input;

a deflection data shift register for receiving the deflection data from said selected identification and deflection data channel and adapted to provide the received deflection data to said position signal input of said character display device;

a relay matrix responsive to said select relay control signal for connecting said selected identification and deflection data channel to said identification data shift register and said deflection data shift register;

first means operable from a reset condition to a set condition in response to said slide ready signal of said slide changer for allowing entry on occurrence of the next index signal of the identification data from said selected identification and deflection data channel into said identification data shift register, said first means being reset thereafter on occurrence of another index signal from said index signal channel;

means responsive to said timing control signals of said timing signal generator for timing entry of said identification data from said identification data shift register to said identification data input of said computer, said dynamic data ready signal output thereof producing a data ready signal when the identified dynamic data in said computer has been responsively readied for readout;

second means operable from a reset condition to a set condition in response to said data ready signal for producing on occurrence of the next index signal a go signal which is applied to the go signal input of said computer to allow identified dynamic data readout from the dynamic data output thereof, said second means being reset thereafter on occurrence of another index signal from said index signal channel;

a dynamic data shift register for receiving the identified dynamic data read out from said computer and storing the same in a channel of said dynamic data channel group of said memory device;

a character display shift register for receiving the stored identified dynamic data from its channel of said dynamic data channel group of said memory device and adapted to provide the received identified dynamic data to said character signal input of said character display device for producing a displayed character according to said received identified dynamic data, said deflection data shift register being adapted to provide its received deflection data to said position signal input of said character display device for positioning said displayed character according to said received deflection data;

means responsive to the reset conditions of said first and second means for allowing entry of the deflection data from said selected identification and deflection data channel into said deflection data shift register, and entry of the stored identified dynamic data from the channel of said dynamic data channel group into said character display shift register;

means responsive to said timing control signals of said timing signal generator for timing the application of the received deflection data in said deflection data shift register to said position signal input of said character display device, and the application of the received identified dynamic data in said character display shift register to said character signal input of said character display device; and means for producing a character video signal from the displayed and positioned character on said character display device, said character video signal being applied to said video mixer and adapted to produce dynamic display data according to said character video signal on said television monitor whereby a composite static and dynamic data display is obtained.

9. A system according to claim 8 including means for manually registering selected photographic slide identification numbers in said photographic slide register, means for automatically registering selected photographic slide identification numbers in said photographic slide register by signals from a slide number output of said computer, and means selectively operable to disconnect said automatic registering means and prevent the automatic registering of photographic slide numbers in said photographic slide register.

10. A system according to claim 8 including means for discretely increasing the deflection data from said deflection data shift register a predetermined number of times during the application of such deflection data to said position signal input of said character display device whereby successively produced display characters are each horizontally displaced a discrete step from the previously displayed character on said character display device.

11. A system according to claim 10 wherein each recorded identification and deflection data channel includes identification and deflection data for an even photographic slide identification number and an odd one, said system including means responsive to the photographic slide number selectively registered in said photographic slide register for controlling entry of the corresponding one of the even and odd identification data from said selected identification and deflection data channel into said identification data shift register and the corresponding one of the even and odd deflection data from such data channel into said deflection data shift register.

References Cited

UNITED STATES PATENTS

| | | | |
|---|---|---|---|
| 2,938,949 | 5/1960 | Vosburgh | 178—6.8 |
| 3,258,525 | 6/1966 | Piatt | 178—5.4 |
| 3,332,071 | 7/1967 | Goldman | 340—172.5 |

OTHER REFERENCES

Talmadge: "A Shipboard Satellite Position Display," NRL report 5638, U.S.N.R.L., Aug. 7, 1961, pp. 1–15.

ROBERT L. GRIFFIN, *Primary Examiner.*

J. A. ORSINO, *Assistant Examiner.*